(12) United States Patent
Waugh et al.

(10) Patent No.: US 8,318,241 B2
(45) Date of Patent: Nov. 27, 2012

(54) METHOD OF MANUFACTURE OF AN ELECTRODE FOR A FUEL CELL

(75) Inventors: William John Waugh, Edinburgh (GB); Alan MacDonald Davidson, Edinburgh (GB)

(73) Assignee: The Court of Edinburgh Napier University, Edinburgh (GB)

(*) Notice: Subject to any disclaimer, the term of this patent is extended or adjusted under 35 U.S.C. 154(b) by 216 days.

(21) Appl. No.: 12/866,161

(22) PCT Filed: Oct. 3, 2008

(86) PCT No.: PCT/GB2008/003342
§ 371 (c)(1),
(2), (4) Date: Aug. 4, 2010

(87) PCT Pub. No.: WO2009/044144
PCT Pub. Date: Apr. 9, 2009

(65) Prior Publication Data
US 2011/0017702 A1   Jan. 27, 2011

(30) Foreign Application Priority Data
Oct. 3, 2007   (GB) .................................. 0719260.2

(51) Int. Cl.
*B05D 5/12* (2006.01)
*B05D 3/00* (2006.01)

(52) U.S. Cl. ........ 427/115; 427/197; 427/205; 427/304; 427/305

(58) Field of Classification Search .................. 427/115, 427/197, 205, 304, 305
See application file for complete search history.

(56) References Cited

U.S. PATENT DOCUMENTS
3,400,019 A * 9/1968 Le Duc .......................... 429/517

FOREIGN PATENT DOCUMENTS
JP   09-115525   *   5/1997
JP   09 115525 A   5/1997

OTHER PUBLICATIONS

Shibli et al. "ZrO2-reinforced Ni-P plate: An effective catalytic surface for hydrogen evolution", Applied Surface Science, vol. 253 pp. 2189-2195 (2006).*

Shibli, S.M.A. et al. $ZrO_2$-reinforced Ni-P plate: An effective catalytic surface for hydrogen evolution. *Applied Surface Science, Elsevier*, Amsterdam, NL, 253:4, pp. 2189-2195 (2006).

Esfakur Rahman, A.H.M. et al. Microstructure characterization and electrical conductivity of electroless nano Ni coated 8YSZ cermets. *Surface & Coatings Technology, Elsevier*, Amsterdam, NL, 202:10, pp. 2182-2188 (2007).

* cited by examiner

*Primary Examiner* — Brian K Talbot
(74) *Attorney, Agent, or Firm* — Drinker Biddle & Reath LLP

(57) ABSTRACT

A method of manufacture of an electrode for a fuel cell, the method comprising at least the steps of: (a) providing an electrode substrate; (b) contacting at least a part of the electrode substrate with an electroless plating solution comprising a reducing agent, a metal precursor and a suspension of particulate material; and (c) electrolessly plating the metal from the metal precursor onto the contacted part of the electrode substrate, thereby co-depositing the particulate material on the contacted part of the electrode substrate to provide the electrode.

14 Claims, 5 Drawing Sheets

METHOD OF MANUFACTURE OF AN ELECTRODE FOR A FUEL CELL

The present invention relates to a method of manufacture of an electrode, such as an anode or a cathode, for a fuel cell, particularly a solid oxide fuel cell (SOFC), and an electrode manufactured according to the method.

Fuel cells are electrochemical devices which convert the chemical energy in fuels into electrical energy. FIG. 1a shows a schematic representation of a planar fuel cell. Fuel cells comprise at least an electrolyte, E, and two electrodes, namely an anode, A, and a cathode, C, and may additionally comprise an interconnect, I. Fuel cells are typically constructed from an electrolyte sandwiched between two porous electrodes. In solid oxide fuel cells, a flow of an oxygen-containing gas, X, passes over the cathode, C, where the oxygen is reduced at the cathode/electrolyte interface to produce oxide ions. The oxide ions diffuse into the electrolyte, E, and migrate to the anode, A, where they can combine with the fuel from a flow of fuel, Y, to liberate electrons which pass to an external circuit via an interconnect, I. In contrast, other types of fuel cell such as Proton Exchange membrane (PEM) fuel cells operate with hydrogen ions diffusing through the electrolyte.

The direction of the current flow, Z, in FIG. 1a is shown moving from the bottom to the top of the arrangement, with the length of the cell repeat unit shown as distance R. An alternative tubular construction for a fuel cell is shown in FIG. 1b. The reference characters for the various components and flows are identical to those of FIG. 1a.

The selection of materials for SOFCs presents a number of technical challenges. Each component must have the required electrical properties as well as the chemical and mechanical stability to endure fabrication and operational conditions. In particular, SOFCs may operate at very high temperatures, such as approximately 1000° C., in order to achieve sufficiently high current densities and power output. The coefficients of thermal expansion of the components must be closely matched to prevent thermal mismatch and mechanical failure.

Cermet materials, which are composite materials of ceramics and metals, can be used as electrode materials for solid oxide fuel cells. For instance, nickel-yttria stabilised zirconia can be used as an anode material. Cermets allow the coefficients of thermal expansion (CTEs) of the metallic and ceramic components of the electrode to be matched with the electrolyte. In addition, by using a composite electrode the adhesion of the electrode to the electrolyte can be significantly improved.

Such cermets can be prepared by various techniques, for instance by the mixed oxide route, co-precipitation, slurry coating, liquid dispersion and the thermal decomposition of aqueous decomposable salt solutions.

"Preparation of nickel coated YSZ powder for application as an anode for solid oxide fuel cells", Pratihar et al, Journal of Power Sources, 129 (2004), 138 discloses the electroless plating of nickel onto YSZ particles. The nickel-plated YSZ particles must be compressed, sintered and reduced prior to use as a SOFC anode.

Such manufacturing methods requiring sintering and reduction steps, are costly both in terms of energy requirements and equipment. Furthermore, the sintering step promotes the formation of larger conductive metal grains, for example nickel grains, which results in a reduction in the length of grain boundaries and a corresponding reduction in fuel cell performance. In addition, cermets produced in this manner typically have defects due to a coefficient of thermal expansion mismatch between the anode and the electrolyte in the fuel cell.

It is an object of the present invention to provide a method of manufacture of an electrode for a fuel cell which addresses these problems. In particular, the present invention provides a method of manufacture of an electrode, such as an anode or a cathode, which does not require a sintering or a reduction step. By dispensing with a sintering step, the particle size of the conductive metal grains remains unchanged after cermet formation. The single step co-deposition of the metal and particulate material provides cost and energy efficiency advantages compared to a multi-step method.

It is a further object of the present invention to provide a method which allows the selection of electrode, such as the anode or cathode, properties. The co-deposition of the metal and the particulate material allows the coefficient of thermal expansion (CTE) of the cermet electrode to be tailored to the coefficient of thermal expansion of the electrolyte, minimising any CTE mismatch within the cell. By varying the proportion of the metal to particulate material co-deposited on the substrate, it is possible to alter the electrical conductivity and porosity of the electrode. It will be apparent that the objects of the present invention are applicable to one or both of the anode and cathode of a fuel cell.

In a first aspect, the present invention provides a method of manufacture of an electrode for a fuel cell, the method comprising at least the steps of:

(a) providing an electrode substrate;

(b) contacting at least a part of the electrode substrate with an electroless plating solution comprising a reducing agent, a metal precursor and a suspension of particulate material; and (c) electrolessly plating the metal from the metal precursor onto the contacted part of the electrode substrate, thereby co-depositing the particulate material on the contacted part of the electrode substrate to provide the electrode.

The method of the present invention utilises a plating solution to electrolessly deposit a metal onto the electrode substrate. The plating solution comprises a reducing agent, a metal precursor and a suspension of a particulate material. The suspended particulate material is co-deposited with the metal on the electrode substrate during the electroless plating process. As well as adjusting the CTE of the deposit, the particulate material increases the surface area of the electrode to provide a greater area of the triple phase boundary between the electrode, electrode substrate such as the electrolyte and the gaseous fuel or oxidant.

In one embodiment, the metal to be deposited is one or more selected from the group consisting of: nickel, cobalt, platinum, rhodium, ruthenium, rhenium and palladium, or an alloy of more than one of these metals. The metal preferably comprises nickel. These metals are suitable for use in the manufacture of both anodes and cathodes. The metal to be deposited is provided by a metal precursor in the plating solution. The metal precursor is preferably a metal salt, and should be soluble in the plating solution to provide free metal ions.

In a further embodiment, the particulate material co-deposited with the metal can be selected from the group consisting of: yttria stabilised zirconia (YSZ), ceria stabilised zirconia (CeSZ), cerium gadolinium oxide, samarium-doped ceria, mixed lanthanum gallium oxides, lanthanum strontium manganate, YSZ-stabilised lanthanum strontium manganate, barium cobalt oxide, lanthanum-strontium iron-cobalt oxide, lanthanum-strontium cobalt-copper oxide, samarium-strontium cobalt oxide and mixtures thereof.

When an anode is to be manufactured, the particulate material co-deposited with the metal can be selected from the group consisting of: yttria stabilised zirconia (YSZ), ceria stabilised zirconia (CeSZ), cerium gadolinium oxide, samarium-doped ceria, mixed lanthanum, gallium oxides and mixtures thereof. When a cathode is to be manufactured, the particulate material co-deposited with the metal can be selected from the group consisting of: lanthanum strontium manganate, such as $La_{0.85}Sr_{0.15}MnO_3$, YSZ-stabilised lanthanum strontium manganate, such as YSZ—$La_{0.85}Sr_{0.15}MnO_3$ and YSZ—$La_{0.8}Sr_{0.2}MnO_3$, barium cobalt oxide $BaCoO_3$, lanthanum-strontium iron-cobalt oxide, such as $(La, Sr)_1(Fe, Co)_1O_{3-\delta}$, lanthanum-strontium cobalt-copper oxide, such as $(La, Sr)_1(Co, Cu)_1O_{3-\delta}$, samarium-strontium cobalt oxide, such as $Sm_{0.6}Sr_{0.4}CoO_3$ and mixtures thereof.

The particulate material may have a particle size in the range from 0.1-50 micrometers, more preferably in the range from 0.2-40 micrometers, depending on the application and the fuel cell design.

The co-deposition of the metal and the particulate material on the electrode substrate forms the electrode of the fuel cell. It is preferred that the electrode substrate forms either the electrolyte or the interconnect of the fuel cell. Forming the electrode directly on the electrolyte or the interconnect simplifies the construction of the fuel cell. It is therefore preferred that the electrode substrate is a continuous i.e. non-particulate electrode substrate, such as a monolith, rather than a particulate substrate. The substrate can take any shape. For example, it may be planar to conform to planar SOFC design, or it may be cylindrical to conform to tubular SOFC design.

In one embodiment, the electrode substrate is selected from the group consisting of: lanthanum chromate, doped lanthanum chromate, doped lanthanum gallate, lanthanum manganate, doped lanthanum manganate, yttria stabilised zirconia (YSZ), ceria stabilised zirconia (CeSZ), cerium gadolinium oxide, samarium-doped ceria, mixed lanthanum and gallium oxides and mixtures thereof. Alternatively the electrode substrate may be a metallic substrate such as chromium-based, iron-based and nickel-based alloys or a polymeric substrate depending on the fuel cell design. Lanthanum chromate, doped lanthanum chromate, lanthanum manganate and doped lanthanum manganate are suitable substrate materials for the interconnect of the fuel cell. Yttria stabilised zirconia (YSZ), ceria stabilised zirconia (CeSZ), cerium gadolinium oxide, samarium-doped ceria and mixed lanthanum and gallium oxides are suitable substrate materials for the electrolyte of the fuel cell.

The reducing agent in the plating solution should be capable of causing the reduction of the metal in the metal precursor to metal. It is preferred that the reducing agent comprises hypophosphite, but alternatives may be used depending on the metal to be deposited. The hypophosphite is preferably a hypophosphite salt, such as sodium hypophosphite.

The plating solution also comprises a solvent. The solvent should be capable of dissolving the reducing agent and metal precursor. It is preferred that the solvent is water.

In a further embodiment, the plating solution is dosed with one or more of the group selected of: the particulate material, the metal precursor and the reducing agent during plating step (c). Furthermore, the plating solution may also be dosed with reducing agent during plating step (c)

In another embodiment, the concentration of one or more of the group selected from: the particulate material, the metal precursor and the reducing agent in the plating solution is varied during plating step (c).

In a further embodiment, the method of the invention comprises the step of pre-treating the substrate prior to step (b). The pre-treating step may comprise one or more steps selected from the group consisting of: degreasing, electro-cleaning, etching, masking, activating and rinsing.

When the pre-treating step is an activating step, this may comprise depositing an electroless plating catalyst on the substrate. Preferably the electroless plating catalyst is palladium. The activating step may further comprise the step of sensitizing the substrate prior to or at the same time as the deposition of the electroless plating catalyst. This is particularly beneficial in those cases where the substrate is non-conducting, for instance when the substrate is the fuel cell electrolyte such as YSZ. The sensitizing step preferably comprises treating the substrate with a tin (II) chloride solution.

In a further aspect of the present invention, an electrode, such as an anode or cathode for a fuel cell prepared according to the method described herein is provided.

Embodiments of the invention will now be described by way of example only, and with reference to the accompanying non-limiting drawings in which.

Figure 8:
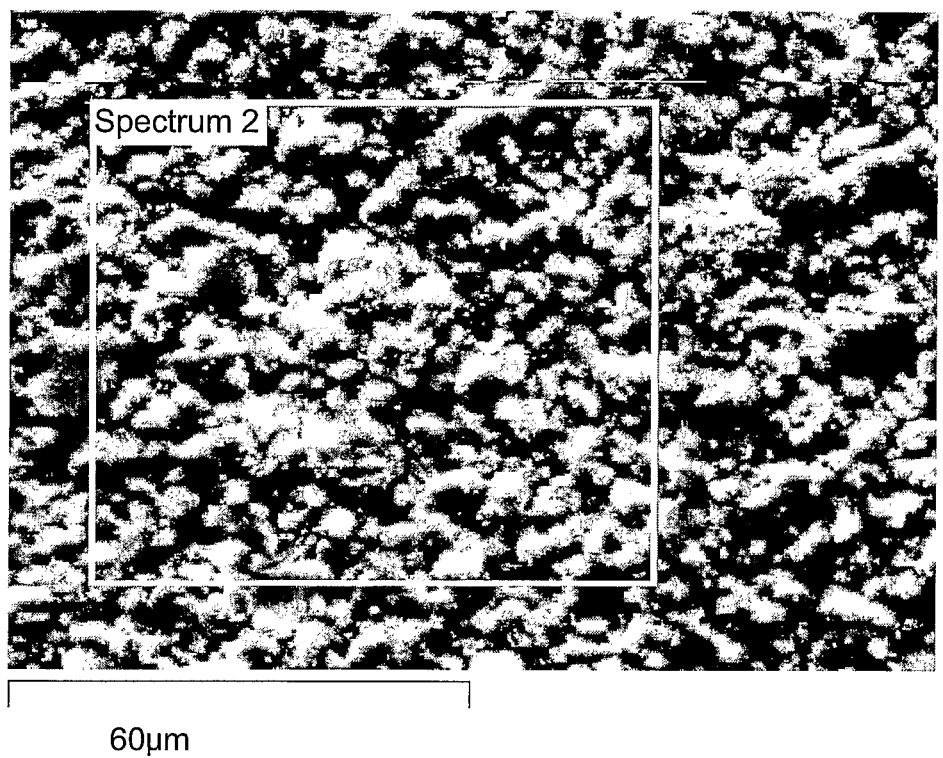
Figure 9:
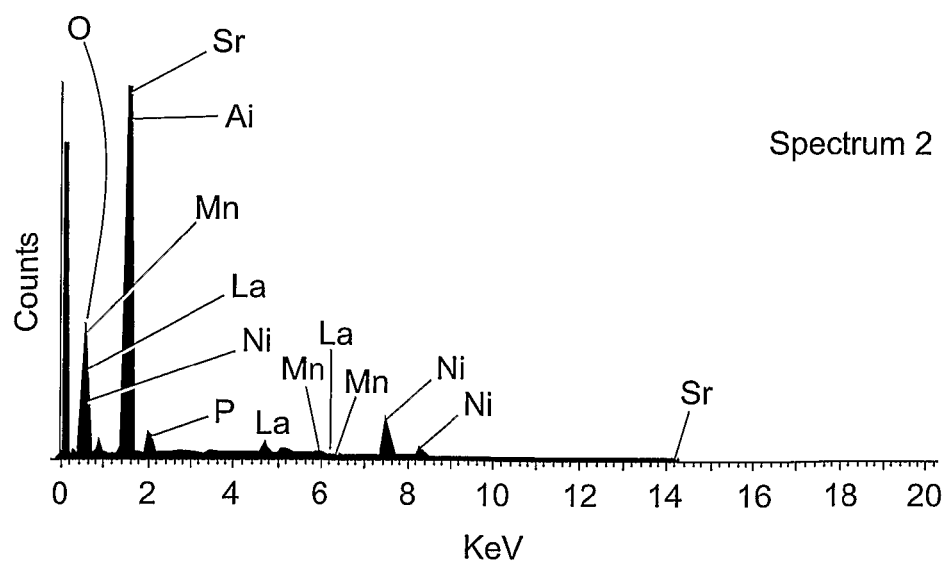

FIG. 8 is a scanning electron micrograph of a cathode comprising co-deposited nickel and lanthanum strontium manganate coating on an alumina substrate manufactured according to a method of the present invention; and FIG. 9 is an energy dispersive X-ray spectrum of a cathode comprising co-deposited nickel and lanthanum strontium manganate coating on an alumina substrate manufactured according to a method of the present invention.

Electroless metal deposition refers to the chemical plating of a metal such as nickel or cobalt onto a substrate by chemical reduction in the absence of external electric current. Known electroless plating solutions generally comprise a metal precursor, such as a source of metal ions, and a reducing agent dissolved in a solvent. The solvent is typically water. The electroless plating solution may further comprise a buffer to provide the required solution pH and a complexing agent for the metal ions capable of preventing their precipitation from solution. Other additives such as stabilizers, brighteners, alloying agents, surfactants may also be present in the plating solution.

The metal deposition involves the reduction of the metal ions to the metallic form by the action of a reducing agent itself or a derivative of the reducing agent. The reducing agent may be a hypophosphite, an amine borane or a borohydride. Once initiated, deposition is autocatalysed by the metal deposited on the surface of the substrate. For example, nickel may be deposited onto a substrate from an aqueous solution of a nickel (II) and hypophosphite ions according to the following reactions:

$$H_2PO_2^- + H_2O \rightarrow H_2PO_3^- + 2H_{abs} \quad (I)$$

$$Ni^{2+} + 2H_{abs} \rightarrow Ni + 2H^+ \quad (II).$$

In this embodiment, the reaction product of the hypophosphite and water (absorbed hydrogen, $H_{abs}$) reacts with the nickel (II) in the solution, rather than the reducing agent itself. It is preferred that the metal precursor is nickel (II) chloride. It is further preferred that the reducing agent is sodium hypophosphite. The solvent can be water.

Concurrently, some of the hypophosphite may react with the absorbed hydrogen to deposit phosphorous onto the substrate, and produce water and hydroxyl ions as shown in reaction (III):

$$H_2PO_2^- + H_{abs} \rightarrow H_2O + OH^- + P \quad (III).$$

As a result, phosphorus may also be deposited with the nickel, forming a nickel-phosphorus alloy. The phosphorus content of the deposit may be determined by the test recited in ISO4527 Annex D Such deposits typically contain 2-14% by weight phosphorous, depending upon the precise nature of the plating solution. In addition to reaction (III), some of the hypophosphite may be oxidised by water to form phosphite with the liberation of gaseous hydrogen as shown in reaction (IV):

$$H_2PO_2^- + H_2O \rightarrow H_2PO_3^- + H_2 \quad (IV).$$

The ability of this electroless nickel deposition process to produce an alloy of nickel and phosphorus in varying composition is particularly advantageous because the variation in phosphorus content can have a significant effect on the microstructure and performance characteristics of the deposit. Thus, depending upon the electroless plating bath conditions and bath composition, the conductive metal can be plated as an amorphous, crystalline or semi-crystalline metal.

For instance, electroless nickel deposits which comprise greater than about 10 wt % phosphorus can be amorphous, while those which comprise less than about 7 wt % phosphorus can have a microcrystalline structure. Those deposits comprising phosphorus in the intermediate range of 7 to 10 wt % are semi-crystalline in nature. The degree of amorphous or crystalline character of the deposit can be altered for a given phosphorus formulation by the addition of additives to the electroless plating solution which affect the growth process of the deposit.

Amorphous deposits, particularly highly amorphous deposits, have significantly fewer grain boundaries which may act as sites for intergranular corrosion and therefore offer superior properties compared to the crystalline deposits which are produced by conventional electrodeposition processes.

In an alternative embodiment, an amine borane may be used as the reducing agent. For example, the reduction of nickel (II) chloride by dimethylamine borane is shown in equation (V):

$$(CH_3)_2HNBH_3 + 3H_2O + NiCl_2 \rightarrow (CH_3)_2NH + H_3BO_3 + 2H_2 + 2HCl + Ni \quad (V).$$

In the present invention, a suspension of a particulate material is also present in the plating solution. It is preferred that the suspension of particulate material is evenly distributed throughout the plating solution, for example by mechanical agitation, for instance using a magnetic or rotary stirrer. The deposition of the nickel entrains the particulate material suspended in the plating solution resulting in the co-deposition of the particulate material with the nickel on the substrate.

The co-deposited nickel and particulate material have an even uniform thickness, even in deep pores and recesses. The uniformity of the coating reproduces the substrate surface finish, which can be roughened to increase its surface area. This also means that the coating can be applied as a final production operation and can meet stringent dimensional tolerances.

It is apparent that as the plating step proceeds, the concentration of metal precursor, reducing agent and particulate material in the plating solution will decrease as these components are consumed. Consequently, one or more of these components may be added to the plating solution during the plating step. The component may be added to the plating solution at regular or irregular intervals, or continuously. The component is preferably added in the solvent used for the plating solution.

The amount of any component added to the plating solution during the plating step may be sufficient to maintain the component at a given concentration, such as the concentration at the start of the plating step. Alternatively, the amount of any component added to the plating solution during the plating step may be varied, or the time interval at which the component is added may be varied in order to adjust the concentration of the component at a particular depth in the co-deposited coating.

For instance, the concentration of the particulate material co-deposited with the metal may be greatest at the start of the plating step such that the proportion of co-deposited particulate material to metal is greatest nearest to the substrate. In this case, if the CTE of the particulate material and substrate are similar, for instance if both the substrate and particulate material comprise YSZ, the CTE of the coating adjacent to the substrate can be more closely matched to the substrate to minimise thermal stresses during cycling and operation. The proportion of the metal co-deposited with the particulate material can be increased in the regions of the coating further from the substrate to provide the requisite electrical conductivity to the anode, and vice-versa.

The plating step is typically carried out by immersing the substrate in a plating bath comprising the plating solution. In the embodiment in which nickel is to be plated from an aqueous plating solution, that the plating bath is typically heated. It is preferred that the plating bath is heated to a temperature in the range of 80 to 100° C., more preferably 85 to 95° C., most preferably about 90° C. to provide an optimum rate of deposition.

Alternatively, the plating step may be carried out by contacting only a part of the substrate with the plating solution, for example by immersing only a portion of the substrate in the plating solution.

Prior to carrying out the electroless plating step, one or more pre-treatment steps may be carried out. It is preferred that the substrate is degreased prior to electroless plating, in either aqueous or non-aqueous cleaners utilising either ultrasonic or soak processes.

If the electrode substrate is a conducting substrate, it can be electrocleaned by methods known in the art.

In another embodiment, only a part of the electrode substrate is contacted with the plating solution by applying a mask, such as those known in the art of etching, to the electrode substrate in a pre-treatment step. Consequently, the metal and particulate material is only co-deposited in those areas of the electrode substrate not covered by the mask.

The operating properties of a fuel cell electrode, such as an anode, are closely related to the surface texture. In order to improve the efficiency of an electrode, it should have a larger surface area to increase the rate of reaction. The surface area of the electrode may be increased by one or both of providing a rougher surface texture and increasing porosity. Combining both of these methods allow the maximisation of the electrode surface area to provide efficient reaction kinetics.

As discussed above, the co-deposited coating has a uniform thickness, even in deep pores and recesses. Therefore, the surface area of the electrode may be increased by one or both of roughening the surface and increasing the porosity of the substrate. This can be achieved by the etching of the electrode substrate surface, for example by wet-phase or dry-phase techniques.

Wet-phase etching utilises a liquid etchant, which may be agitated to achieve good process control. For example, solutions comprising one or both of sulphuric and hydrofluoric acid can be used to etch a YSZ substrate.

Dry-phase etching utilises a plasma or ion stream to remove the surface of the electrode substrate. Plasma etching produces energetic free radicals which are neutrally charged and react with and remove the surface of the electrode substrate. Sputter etching bombards the substrate with a stream of energetic ions, typically of noble gases, which knock atoms from the substrate surface. Alternatively abrasive blasting techniques may be employed to abrade the surface by utilising compressed gas, such as compressed air, and abrasive media.

In order to initiate electroless plating on an insulating electrode substrate, it is necessary to activate the electrode substrate surface. This can be done by a sensitizing and catalysing process. Typically, palladium metal is employed as a catalyst. The catalyst allows the metal plating to proceed as an autocatalytic reaction, without the requirement of an external electrical current source. Palladium particles can be deposited on the insulator surface in a single, double or multi-step process. In the single-step process, the insulating electrode substrate can be treated with a mixed acidic solution of $SnCl_2$ and $PdCl_2$ in the form of a hydrosol to deposit palladium in accordance with reaction (VI):

$$SnCl_2 + PdCl_2 \rightarrow SnCl_4 + Pd \quad \text{(VI)}.$$

The metallic Pd is in colloidal form and is adsorbed onto the electrode substrate surface. The adsorbed colloidal Pd particles act as a catalyst for the metal deposition during subsequent metal plating.

Alternatively, the insulating electrode substrate can be consecutively sensitized with an acidified $SnCl_2$ solution and then catalysed with a $PdCl_2$ solution in a double-step process, with an optional intervening rinsing step. Electrode substrate surface activation can be omitted if the electrode substrate is a conducting substrate.

A further advantage of the method of the present invention is that the metal and particulate material can be co-deposited on insulating as well as conducting electrode substrates, provided that any insulating electrode substrate is activated as discussed above.

It is preferred that the electrode substrate is rinsed between one or more of the pre-treating steps, or between the pre-treating and plating steps. Rinsing removes any residual contaminants from the pre-treating steps, providing a clean surface for the plating step. Rinsing may be carried out with a suitable analytical reagent grade solvent, or high purity deionised water.

The thickness of metal coating applied by electroless plating is dependent upon the time the electrode substrate is immersed in the plating bath. A deposition rate of 16-20 μm per hour is typical for a nickel plating process. The thickness of the deposit can be determined according to ASTM B487.

EXAMPLE 1

Preparation of an Anode on a Conductive Substrate

A polished brass electrode substrate (AMT Limited) of dimensions 25×20×1 mm was pre-treated by degreasing in a solution of Slotoclean FSA (Schloetter Company Limited) at 60° C. for 15 minutes, electrocleaning and rinsing in deionised water at room temperature.

Nickel plating was carried out using an electroless nickel plating solution prepared in a plating bath using Slotonip 2010 (Schloetter Company Limited), to which was added 50 μl YSZ powder stabilised with 8% by weight yttria of nominal particle size 2 μm (Unitec Ceramics Limited) which was kept in suspension by mechanical stirring. The solution was then heated to a temperature of 89° C. using a hotplate stirrer. The brass substrate was then immersed in the plating solution for 30 minutes. After removal from the plating bath, the coated substrate was first rinsed in deionised water, then in propan-2-ol (Analytical Reagent grade), both at room temperature. The nickel and YSZ co-deposited substrate was then allowed to dry in air resulting in a co-deposited coating of YSZ and nickel which was uniform over the surface of the electrode substrate.

EXAMPLE 2

Preparation of an Anode on Insulating Substrates

A commercially available YSZ coated polymer film electrode substrate (Napier University) and a YSZ fuel cell electrode substrate (Fuel Cell Scotland) were pre-treated by degreasing in a solution of Slotoclean FSA (Schloetter Company Limited) at 60° C. for 15 minutes, followed by rinsing in deionised water at room temperature. The insulating electrode substrates were then activated by a double step process comprising immersion in a solution of 200 g/l Uniphase PHP pre-catalyst (AlfaChimici) and 20 ml/l HCl at 20° C. for 15 minutes to provide sensitized substrates. A solution of 20 ml/l Uniphase PHP catalyst (AlfaChimici) was then added to the pre-catalyst solutions containing the electrode substrates and the temperature raised to 35° C. for 15 minutes to provide sensitized and catalysed electrode substrates. The sensitized and catalysed electrode substrates were then removed from the pre-treating solutions and rinsed with deionised water at room temperature.

An electroless nickel plating solution was then prepared in a plating bath using Slotonip 2010 (Schloetter Company Limited), to which was added 50 g/l YSZ powder stabilised with 8% by weight yttria of nominal particle size 2 μm (Unitec Ceramics Limited) which was kept in suspension by mechanical stirring. The solution was then heated to a temperature of 89° C. using a hotplate stirrer. The activated and catalysed insulating electrode substrates were then immersed in the plating solution for 30 minutes. After removal from the plating bath, the coated electrode substrates were first rinsed in deionised water, then in propan-2-ol (Analytical Reagent grade), both at room temperature. The nickel and YSZ co-deposited electrode substrates were then allowed to dry in air.

The unplated substrates and the nickel and YSZ co-deposited electrode substrates were analysed by Scanning Electron Microscopy (SEM) using a Cambridge Stereoscan 90 microscope. Examination of the co-deposited electrode substrates showed that a uniform deposit of a Ni/YSZ composite had been achieved over the complete surface of the substrates.

Figure 1A:
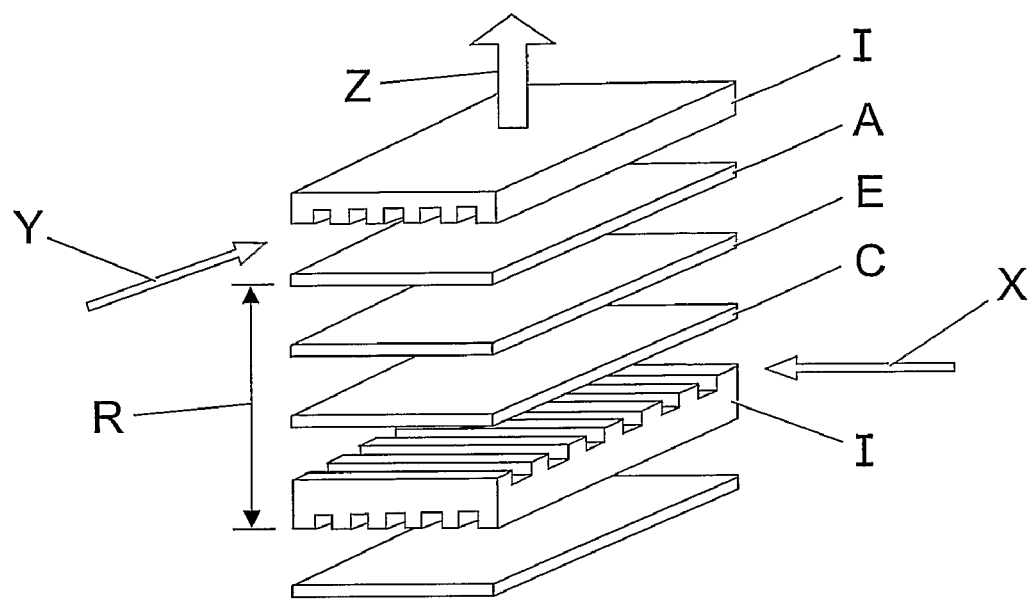
FIG. 1a is a schematic representation of a planar solid oxide fuel cell.
Figure 1B:
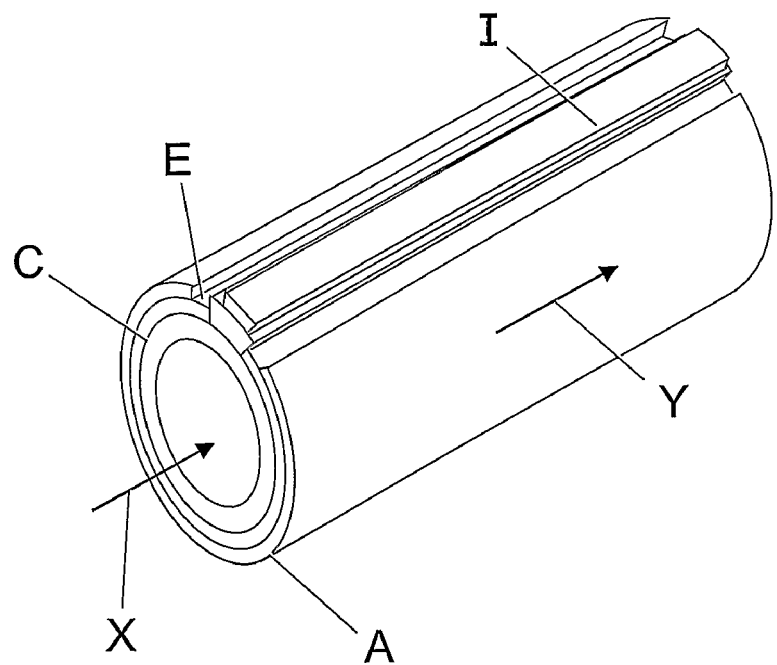
FIG. 1b is a schematic representation of a tubular solid oxide fuel cell.
Figure 2:
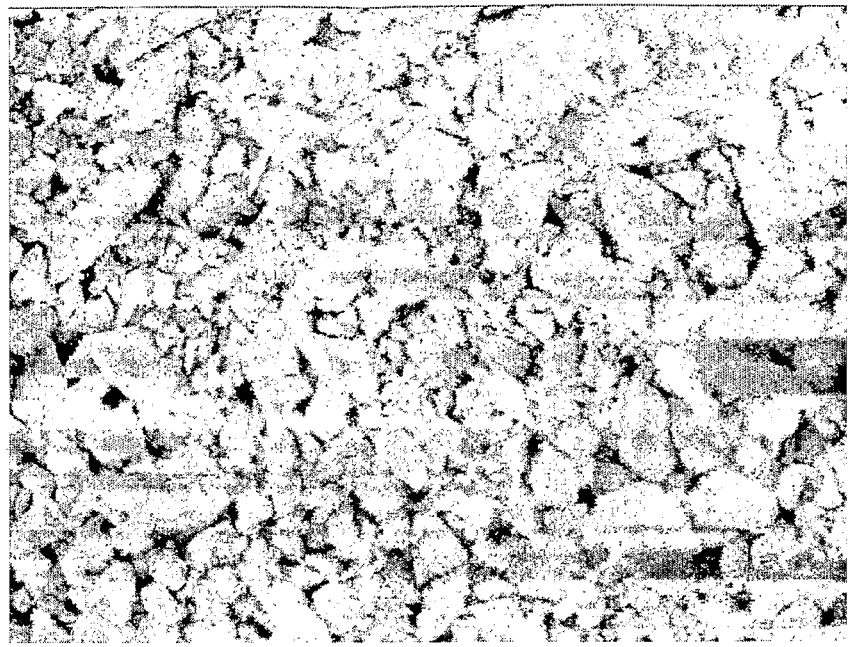
FIG. 2 is a scanning electron micrograph of the uncoated YSZ powder at 3030 magnification.
Figure 3:
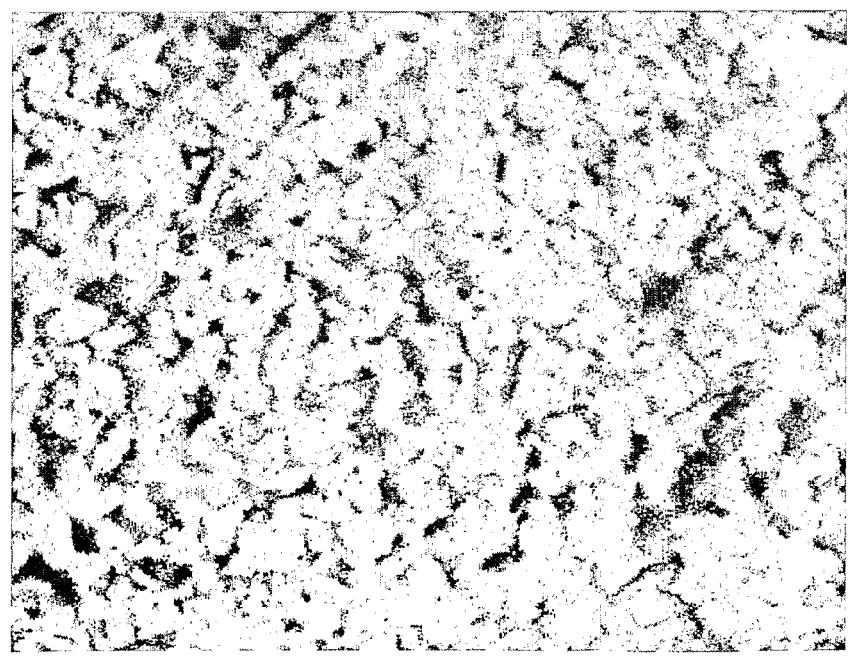
FIG. 3 is a scanning electron micrograph of a co-deposited nickel and YSZ coating on a YSZ coated polymer film substrate manufactured according to a method of the invention at 5000 magnification.

In particular, FIG. 2 shows a scanning electron micrograph of the uncoated YSZ powder at 3030 magnification. FIG. 3 shows a scanning electron micrograph of the co-deposited nickel and YSZ coating on the YSZ coated polymer film substrate (Napier University) prepared in this Example at 5000 magnification. It is apparent from a comparison of FIGS. 2 and 3 that a uniform co-deposition of nickel and YSZ particles was achieved over the surface of the YSZ coated polymer film electrode substrate.

Figure 4:
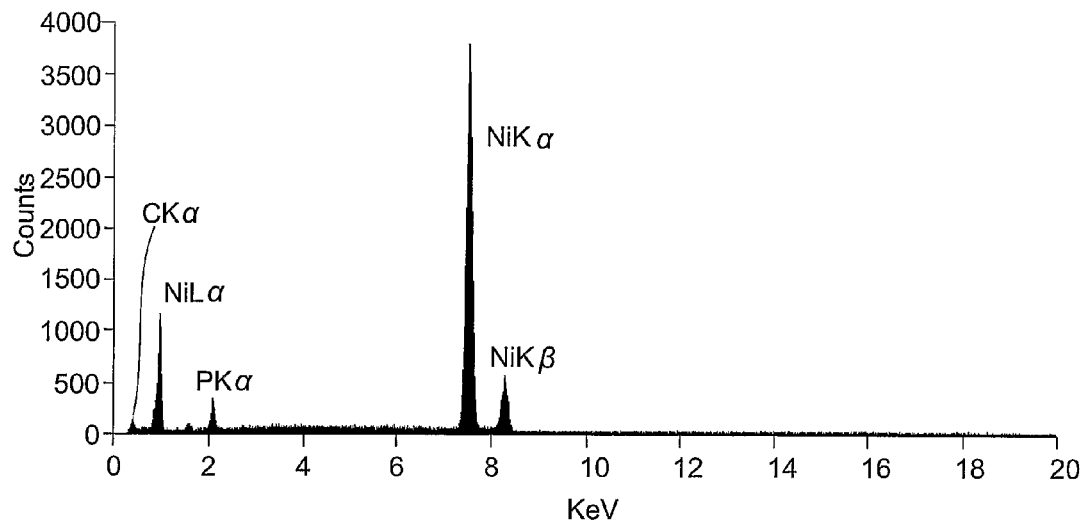
FIG. 4 is an energy dispersive X-ray spectrum of a conventional electroless nickel coating.
Figure 5:
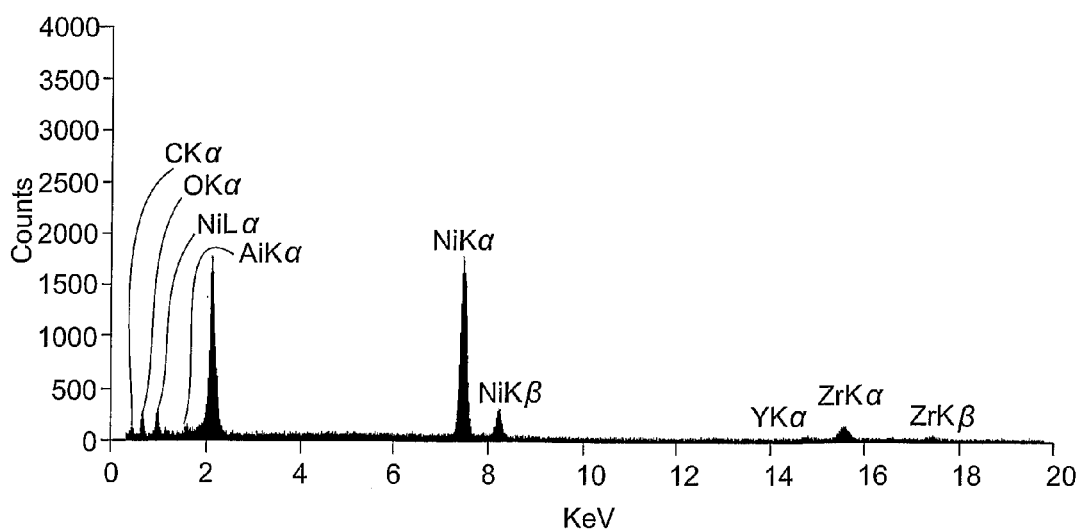
FIG. 5 is an energy dispersive X-ray spectrum for an anode comprising co-deposited nickel and YSZ coating on a YSZ coated polymer film substrate manufactured according to a method of the invention.

The formation of a composite deposit was confirmed by Energy Dispersive analysis of X-rays (EDX) using an i-Scan Microimaging system. FIG. 4 shows an EDX spectrum of a conventional electroless nickel coating. FIG. 5 shows the EDX spectrum for the nickel and YSZ co-deposited YSZ coated polymer film electrode substrate. It is apparent form a comparison of FIGS. 4 and 5 that transition peaks corresponding to nickel from the coating are observed. FIG. 5 additionally shows yttrium, zirconium and oxygen transition peaks from the co-deposited YSZ particulate material. A similar spectrum was obtained for the corresponding co-deposited YSZ fuel cell electrode substrate (Fuel Cell Scotland). The EDX spectra of the co-deposited electrode substrates show that a composite deposit had been obtained. The EDX spectra in combination with SEM analysis confirmed that the surface of the substrates was uniformly coated.

Further analysis of the substrates using a Fisherscope XDL-Z X-Ray Fluorescence instrument showed that a coating thickness of approximately 9 to 11 micrometers had been achieved. The co-deposited YSZ coated electrode substrates are suitable for use as an anode/electrolyte in a SOFC.

EXAMPLE 3

Preparation of an Anode on an Etched Insulating Substrate

The surface roughness of a series of YSZ electrode substrates (Fuel Cell Scotland) was determined in accordance with BS EN ISO 4288:1998, using a Taylor-Hobson 5-60 Talysurf instrument. A diamond tipped stylus, 1.3 µm×3.8 µm truncated pyramid shape, was drawn across the surface of the electrode substrate at a constant speed of 0.5 mm/s for a set distance of 6 mm, to provide an amplified electrical signal corresponding to the vertical displacement of the stylus as it travels across the electrode substrate. The roughness average, Ra, value of the surface is generated from the arithmetical average of the modulus of the departure of the profile from the origin of the signal over the distance measured.

The YSZ electrode substrates were then etched by immersion for five minutes in an acid solution comprising 100 ml/l hydrofluoric acid and 100 ml of sulphuric acid. The electrode substrates were then plated as described in Example 2 and their roughness average measured again. Table 1 shows the surface average results for the pre-etched and etched and co-deposited electrode substrates.

TABLE I

| Sample | Pre-etching, Ra | | | | Post-etching & plating, Ra | | | | ΔRa |
|---|---|---|---|---|---|---|---|---|---|
| | 1 | 2 | 3 | Average | 1 | 2 | 3 | Average | |
| 1 | 0.51 | 0.52 | 0.48 | 0.50 | 0.69 | 0.72 | 0.72 | 0.71 | 0.21 |
| 2 | 0.54 | 0.50 | 0.45 | 0.50 | 0.74 | 0.77 | 0.70 | 0.74 | 0.24 |
| 3 | 0.48 | 0.48 | 0.49 | 0.48 | 0.77 | 0.75 | 0.72 | 0.75 | 0.26 |

Figure 6:
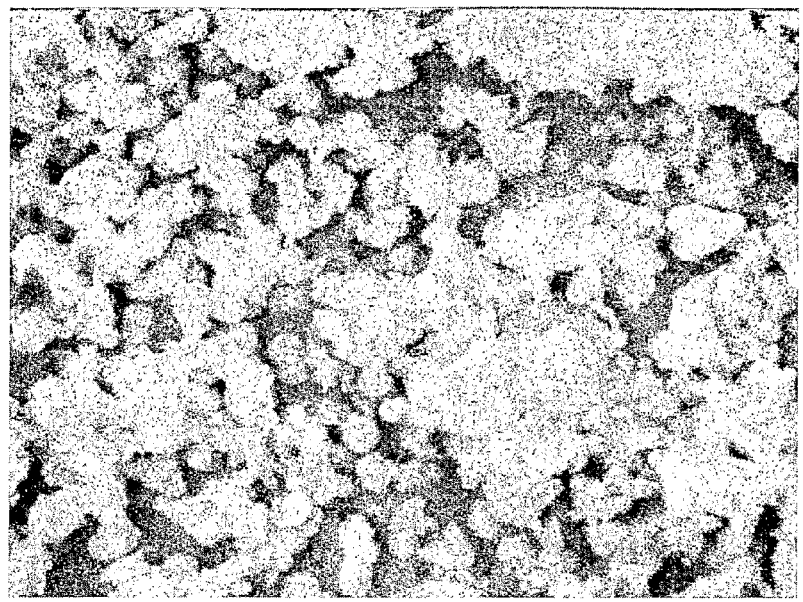
FIG. 6 is a scanning electron micrograph of an anode comprising co-deposited nickel and YSZ coating on an etched YSZ substrate manufactured according to a method of the present invention at 5060 magnification.

FIG. 6 shows a scanning electron micrograph of the co-deposited nickel and YSZ coating on the etched yttria stabilised zirconia electrode substrate at 5060 magnification. The SEM micrograph was produced by a Cambridge Stereoscan 90 microscope. The micrograph shows that the surface etching treatment has a significant effect on the nickel/YSZ co-deposited coating. In addition to the increase in the surface roughness, there was also an increase in the porosity of the co-deposited electrode substrate. An increase in surface roughness and porosity provides a greater surface area of the anode, leading to improved performance.

Figure 7:
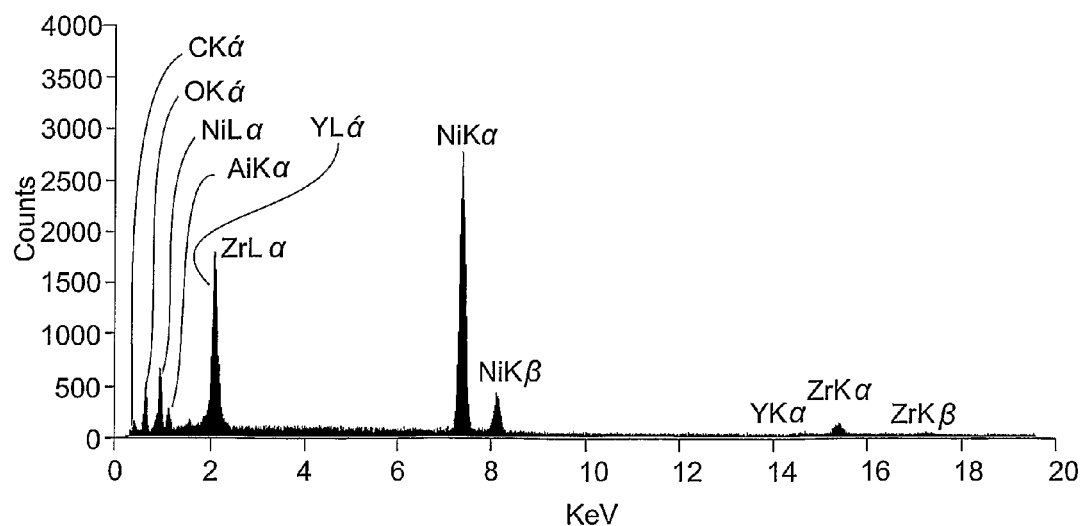
FIG. 7 is an energy dispersive X-ray spectrum of an anode comprising co-deposited nickel and YSZ coating on an etched YSZ substrate manufactured according to a method of the present invention.

The EDX spectra of the co-deposited substrates showed that a composite deposit is obtained. A representative spectrum is shown in FIG. 7. Transition peaks corresponding to the nickel coating and the co-deposited YSZ particulate material are observed. The EDX spectra in combination with SEM analysis confirms that the surface of the electrode substrates is uniformly coated.

XRF analysis of the co-deposited electrode substrate surface using a Fisherscope XDL-Z X-Ray Fluorescence instrument confirms that a coating thickness of 10-13 µm has been achieved.

EXAMPLE 4

Preparation of a Cathode on an Insulating Substrate

An alumina electrode substrate (supplier Napier University) was pre-treated, activated (sensitized) and catalyst added as described in Example 2. The activated and catalysed electrode substrate was then removed from the pre-treating solution and rinsed with deionised water at room temperature.

An electroless nickel plating solution was then prepared in a plating bath using Slotonip 2010 (Schloetter Company Limited), to which was added 50 g/l lanthanum strontium manganate powder of nominal particle size 5 µm (supplier Unitec Ceramics) which was kept in suspension by mechanical stirring. The solution was then heated to a temperature of 89° C. using a hotplate stirrer. The activated and catalysed electrode substrate was then immersed in the plating solution for 30 minutes. After removal from the plating bath, the coated cathode substrate was first rinsed in deionised water, then in propan-2-ol (Analytical Reagent grade), both at room temperature. The nickel and lanthanum strontium oxide co-deposited electrode substrate was then allowed to dry in air.

FIG. 8 shows a scanning electron micrograph of the co-deposited nickel and lanthanum strontium manganate coating on the electrode substrate prepared in this Example. It is apparent from a comparison of FIGS. 2 and 8 that a uniform co-deposition of nickel and lanthanum strontium manganate particles was achieved over the surface of the electrode substrate.

The EDX spectrum of the area shown as "spectrum 2" in FIG. 8 is shown in FIG. 9. Transition peaks corresponding to the nickel coating and the co-deposited lanthanum strontium manganate particulate material are observed. The EDX spectrum in combination with SEM analysis confirms that the surface of the electrode substrate was uniformly coated to provide a cathode suitable for a SOFC.

The person skilled in the art will understand that the invention can be carried out in many various ways without departing from the scope of the appended claims. For instance, the invention encompasses the combination of one or more of the optional or preferred features disclosed herein.

The invention claimed is:

1. A method for the manufacture of a solid oxide fuel cell electrode, the method comprising at least the steps of:
    (a) providing a solid oxide fuel cell electrode substrate;
    (b) contacting at least a part of the electrode substrate with an electroless plating solution comprising a reducing agent, a metal precursor and a suspension of particulate material; and
    (c) electrolessly plating the metal from the metal precursor onto the contacted part of the electrode substrate, thereby co-depositing the particulate material on the contacted part of the electrode substrate to provide the electrode.

2. The method of claim 1 wherein the reducing agent comprises hypophosphite.

3. The method of claim 1 wherein during plating step (c) the plating solution is dosed with one or more of the group consisting of: the reducing agent, the metal precursor, the particulate material and a mixture thereof.

4. The method of claim 3 wherein the concentration of one or more of the group consisting of the reducing agent, the particulate material and the metal precursor in the plating solution is varied during the plating step.

5. The method of claim 1 further comprising the step of pre-treating the substrate prior to step (b).

6. The method of claim 5 wherein the pre-treating comprises one or more steps selected from the group consisting of: degreasing, electrocleaning, etching, masking, activating and rinsing.

7. The method of claim 6 wherein said activating step comprises depositing an electroless plating catalyst on the substrate.

8. The method of claim 7 wherein the electroless plating catalyst is palladium.

9. The method of claim 7 further comprising the step of sensitizing the substrate prior to or at the same time as the deposition of the electroless plating catalyst.

10. The method of claim 9 wherein the sensitizing step comprises treating the substrate with a tin (II) chloride solution.

11. The method of claim 1 wherein the metal of the metal precursor is selected from one or more of the group consisting of: nickel, cobalt, platinum, rhodium, ruthenium, rhenium and palladium.

12. The method of claim 1 wherein the particulate material is selected from the group consisting of yttria stabilised zirconia, ceria stabilised zirconia, cerium gadolinium oxide, samarium-doped ceria, mixed lanthanum and gallium oxides, lanthanum strontium manganate, yttria stabilised zirconia-stabilised lanthanum strontium manganate, barium cobalt oxide, lanthanum-strontium iron-cobalt oxide, lanthanum-strontium cobalt-copper oxide, samarium-strontium cobalt oxide and mixtures thereof.

13. The method of claim 1 wherein the electrode substrate is selected from the group consisting of: lanthanum chromate, doped lanthanum chromate, doped lanthanum gallate, lanthanum manganate, doped lanthanum manganate, yttria stabilised zirconia, ceria stabilised zirconia, cerium gadolinium oxide, samarium-doped ceria and mixed lanthanum, gallium oxides and mixtures thereof.

14. The method of claim 1 wherein the electrode substrate is a YSZ-coated polymer film electrode substrate.

* * * * *